W. P. FREY.
DRIVING AXLE CONSTRUCTION.
APPLICATION FILED NOV. 22, 1920.
1,400,949.
Patented Dec. 20, 1921.
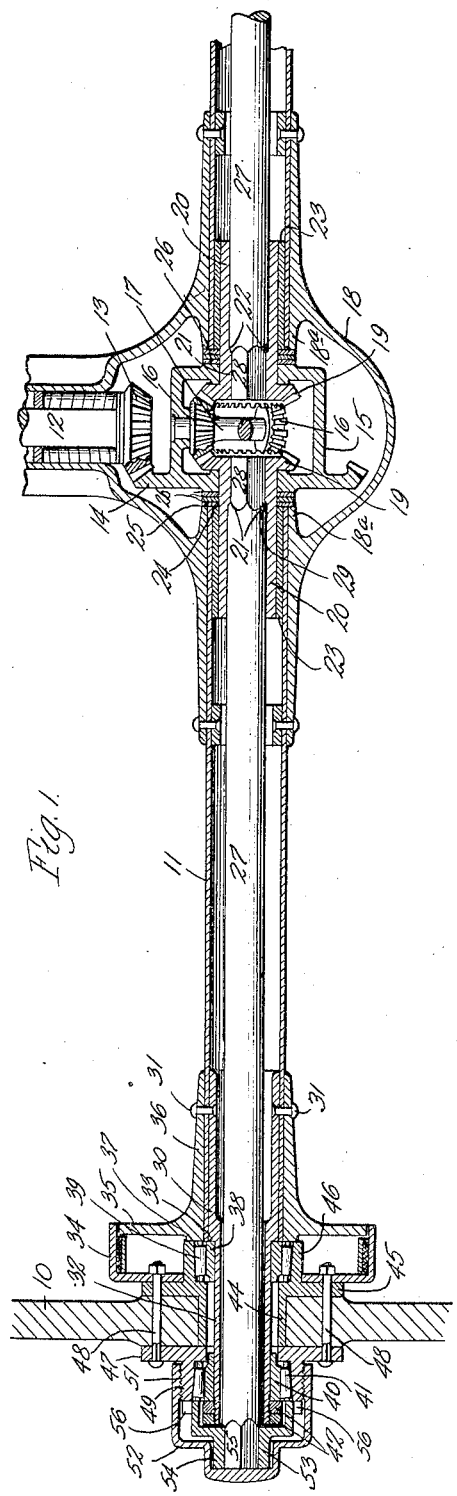
INVENTOR.
William P. Frey
by Parker Brockum
ATTORNEYS.

UNITED STATES PATENT OFFICE.

WILLIAM P. FREY, OF BUFFALO, NEW YORK.

DRIVING-AXLE CONSTRUCTION.

1,400,949.

Specification of Letters Patent.   Patented Dec. 20, 1921.

Application filed November 22, 1920.   Serial No. 425,611.

*To all whom it may concern:*

Be it known that I, WILLIAM P. FREY, citizen of the United States, residing at Buffalo, in the county of Erie and State of New York, have invented a new and useful Improvement in Driving-Axle Construction, of which the following is a specification.

This invention relates to driving axles and axle housing construction and is particularly adapted for use in the rear or driving axle construction of the well known "Ford" automobiles.

In motor vehicles of the type referred to, the driven road wheels are usually connected directly to the axle parts with the result that under heavy shocks or strains the axles are liable to be broken. Furthermore, in vehicles of this type the differential is usually so mounted that it is necessary to dismantle the differential to remove or replace a defective or broken axle part.

The objects of this invention are to provide a driving axle and axle housing construction wherein the driven wheels of a vehicle will be mounted on parts of the hollow axle shaft or housing; also to provide a driving axle construction consisting of relatively few parts, which is of simple and strong construction; also to provide a driving axle construction which will permit of ready dismantling and of the axle parts being disconnected from the differential without taking down the differential. A further object is to provide an improved driving axle construction which may be readily applied to standard automobiles of the "Ford" or similar type to provide a full-floating driving axle. Further objects are to provide improvements in driving axle construction in the other respects hereinafter set forth and claimed.

In the accompanying drawings:

Figure 1 is a fragmentary sectional plan view of a rear axle and rear axle transmission and housing of a motor vehicle.

Fig. 2 is a fragmentary side elevation thereof with the hub cap removed.

Fig. 3 is a sectional elevation of the improved differential gear thereof.

Fig. 4 is a side elevation of the outer axle bearing sleeve thereof.

In the drawings:

10 designates a driven wheel of a vehicle, and 11 a hollow axle shaft or tubular axle housing. 12 designates the drive shaft which is provided with a drive pinion 13 which meshes with a bevel gear 14 attached to the differential drum 15. The differential drum 15 houses the differential pinions 16 which are mounted on a spider 17, and 18 designates the differential housing which is connected to the hollow axle shaft or housing, 11. The differential housing is formed with inwardly extending necks or collars 18ª providing bearings for the differential gear shanks. All of these parts may be constructed as is usual in cars of the "Ford" type.

According to the invention the drive is taken from the differential pinions 16 on bevel gears 19 which differential gears are provided with sleeves or hollow shanks or stems 20 which project outwardly a distance from the differential drum 15. The hollow shanks 20 of the differential gears are preferably formed with reduced angular recesses 21 providing inner annular shoulders 22. 23 designates a bushing interposed between the shank 20 of the differential gear and the hollow axle 11, and the shank 20 of the differential gear is adapted to fit loosely therein so that it may turn relatively to the bushing 23. The bushing 23 is preferably drive-fitted or sweated to the hollow axle shaft 11 and has an abrupt inner edge 24 which is preferably flush with the inner end edge of the hollow axle shaft and bearing neck portion of the differential housing so as to form an abrupt annular shoulder as at 25. 26 designates end thrust washers surrounding the shank 20 of the differential gear and interposed between the abrupt shoulder 25 and a face of the differential drum 15. 27 designates an axle or driven shaft which is provided with an angular or squared and preferably reduced inner end 28 which is adapted to enter the angular recess in the sleeve 20 of the differential gear so that the shaft will rotate as the gear is turned. The reduced inner end 28 of the axle shaft provides an annular shoulder 29 which wedges against the shoulder 22 in the gear shank to limit movement of the shaft inwardly of the gear. It is preferred that the shaft fit snugly into the sleeve 20 so that there will be no play between the parts but so that the shaft may be readily withdrawn or inserted. 30 designates a bearing sleeve which is secured in suitable manner to the axle housing as by rivets 31. This sleeve 30 has a reduced end portion 32 and is preferably provided with an annular outer shoulder 33. The outer end of the hollow axle 11 preferably terminates flush with this shoulder. 34 designates a brake drum the inner side of which is closed by a head portion 35 which is provided with a sleeve 36 surrounding a part of the hollow axle and secured thereto. The brake drum is preferably formed with an annular shoulder 37 flush with the outer end of the hollow axle shaft and shoulder 33 on the bearing sleeve. 38 designates a ring positioned on the reduced portion 32 of the sleeve 30 which ring carries roller bearings 39. The bearings 39 and bearing ring 38 rest at one side upon the bearing shoulders 33 and 37. The outer end of the portion 32 of the sleeve supports a second bearing ring 40 which is provided with roller bearings 41, the outer ring being held in place by means of nuts 42 threaded on the sleeve 30. 43 designates a hub adapted to receive the spokes of the wheel 10 having parts bearing upon the rollers 39 and 41. In the preferred construction shown, this hub is provided with a collar or ring 44 and an inner hub plate or attaching portion 45 and an annular lateral flange portion 46 which surrounds and bears upon the rollers 39. The inner end of this lateral flange portion 46 bears against the annular shoulder 37 formed on the drum head. 47 designates an outer hub plate which is adapted to be placed on the face of the wheel, the inner edge of the hub plate contacting with the outer edge of the collar or ring 44. The brake drum 34, the hub plate 47 and the inner hub plate 45 are connected together and to the wheel by means of suitable bolts 48. The hub plate 47 is provided with a bearing portion adapted to contact with the rollers 41. In the embodiment shown, this is in the form of an annular lateral flange 49 which surrounds the rollers 41. Interengaging parts are provided for maintaining a driving connection between the axle 27 and outer hub plate 47. To accomplish this, as shown, the flange 49 may be provided on its outer edge with a plurality of recesses 50 and the periphery of this flange 49 is preferably screw threaded as at 51 so as to retain the usual hub cap 52 in place. 53 designates a driving member or nut provided with an angular recess 54 which is adapted to receive the squared outer end 55 of the drive axle 27 so that the driving member will turn with the axle. The driving member or nut is provided with a plurality of radial teeth or lugs 56 adapted to enter the recesses 50 on the outer hub plate flange, whereby when the shaft is turned the wheel will be driven.

In the construction shown, the weight of the vehicle is supported on the bearing sleeves from the hollow axle and the danger of bending or breaking a driving axle in this type of car is done away with. In case of any damage to the driving axle or shaft, however, the axle or shaft may be readily removed by removing the hub cap and driving member or nut on the end of the shaft, whereupon the driving shaft may be readily withdrawn endwise from the hollow axle housing, which operation does not disturb the wheel mounting or the transmision or differential.

While axle and axle drive construction of this invention may be constructed and assembled *de novo*, it is particularly adaptable of application to "Ford" automobiles or vehicles of similar type to replace the usual rigid axle drive. Such adaptation is accomplished by removing the usual differential gears, rear axles, the rear axle roller bearings and roller bearing sleeves, inserting differential gears of the form described and placing the bushing 23 in position and inserting the drive axles 27. The bearing sleeve 30 is connected to the usual axle housing, which housing serves as the hollow axle of the converted drive. The improved hub and hub plates replace the usual attachments on the wheels, the parts being assembled as is obvious from the drawings and description, thereby providing a full-floating axle, the drive axles of which bear no part of the weight of the vehicle and which may be readily removed.

I claim as my invention:

1. In a driving axle construction for motor vehicles, the combination of a differential gear drum, means for driving said differential drum, a housing for said differential gear drum, and a hollow axle shaft connected to said differential housing, a differential gear in said gear drum, said differential gear having a shank projecting outwardly from said drum into said hollow axle, a bushing interposed between said gear shank and said hollow axle, said gear shank having an angular recess therein, and an axle shaft having an end fitted into the recess in said gear shank, a road wheel connected for driving to said axle shaft, and means connected to and extending from said hollow axle shaft providing a bearing on which said wheel revolves.

2. In a driving axle construction for motor vehicles, the combination of a differential gear drum, means for driving said differential drum, a housing for said differential gear drum, and a hollow axle shaft connected to said differential housing, a differential gear in said gear drum, said differential gear having a shank projecting outwardly from said drum into said hollow axle, a bushing interposed between said gear shank and said hollow axle, the inner ends of said differential housing, said hollow axle and said bushing being flush and forming an abrupt annular shoulder, thrust washers between said annular shoulder and said differential drum, and an axle shaft fitted at one end in the shank of said differential gear.

3. In a driving axle construction for motor vehicles the combination of a differential gear drum and a housing therefor, means for driving said differential drum, a hollow axle shaft connected to said differential housing, a differential gear having a shank projecting outwardly from said drum into said hollow axle, a bushing interposed between said gear shank and said hollow axle, said gear shank having an angular recess therein, and an axle shaft extending through said hollow axle, said axle shaft having an end fitted into the recess in said gear shank.

4. In a driving axle construction for motor vehicles, the combination of a differential gear drum, means for driving said differential drum, a housing for said differential gear drum and having inwardly extending collars at opposite sides within said housing, a pair of hollow axle shafts connected to said differential housing and extending into said collars, a pair of differential gears in said gear drum, said gears having shanks projecting outwardly from said drum into said hollow axle through said collars, bushings interposed between said gear shanks and said hollow axles, the inner end edges of said collars, said hollow axles and said bushings forming a pair of abrupt annular shoulders, and thrust washers between said annular shoulders and the sides of said differential drum.

5. In a driving axle construction for motor vehicles, the combination of a differential gear drum, means for driving said differential drum, a housing for said differential gear drum and having inwardly extending collars at opposite sides within said housing and oppositely extending sleeves, a pair of hollow axle shafts secured in said sleeves, a pair of differential gears in said gear drum, said gears having shanks projecting outwardly from said drum into said hollow axles in said sleeves, bushings interposed between said gear shanks and said hollow axles, and thrust washers between the inner edges of said collars and said differential drum.

November 19, 1920.

WILLIAM P. FREY.